Patented June 12, 1928.

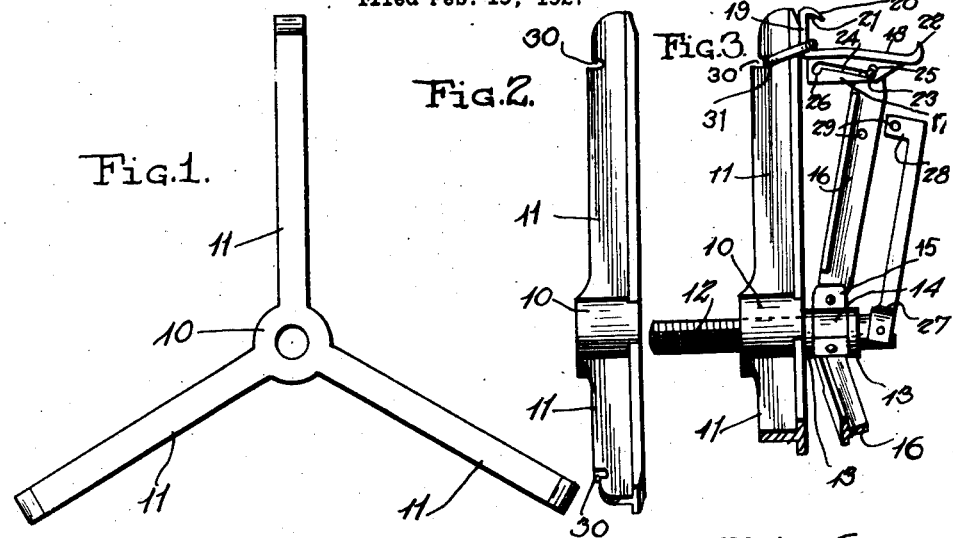
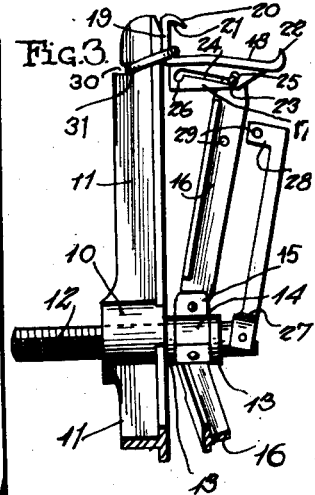
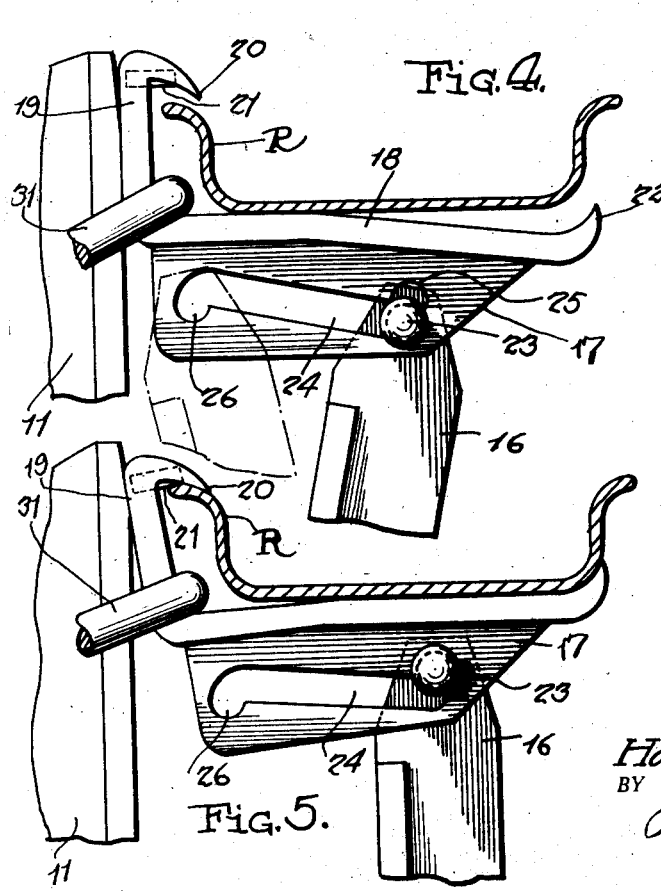
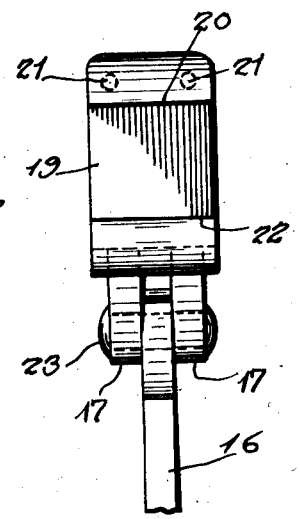

1,672,918

UNITED STATES PATENT OFFICE.

HARRY L. SWAN, OF MILBANK, SOUTH DAKOTA.

COMBINED PORTABLE RIM CONTRACTOR, SPARE-TIRE LOCK, AND CARRIER.

Application filed February 19, 1927. Serial No. 169,582.

This invention relates to a vehicle attachment in the nature of a rim contractor, tire carrier and spare tire lock.

One important object of the invention is to provide a novel portable device of this character combining in itself a carrier for spare tires, a rim contracting device and a locking device to hold the spare tire against improper removal.

A second important object of the invention is to provide a novel device of this character which can be readily attached to any automobile.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a face view of a certain spider herewith.

Figure 2 is a side elevation of the spider.

Figure 3 is a side elevation of the upper part of the device assembled.

Figure 4 is an enlarged view of the parts associated with one of the spider arms and showing the same in the position which they assume when ready to engage and lock the rim of the tire on the carrier.

Figure 5 is a similar view showing the parts in the position assumed with the spare tire secured thereon against removal.

Figure 6 is a face view of the parts shown in Figure 5.

In the present embodiment of the invention there is provided a main portion consisting of a spider having a hub 10 and a series of radiating rigid arms 11 preferably T-shaped in cross section. The hub 10 is threaded to receive the screw 12 and on the outer end of this screw is provided a pair of spaced or fixed collars 13 between which there is rotatably mounted on the screw, a sleeve 14 having a pair of ears 15 projecting radially therefrom. Between the ears of each pair is pivoted one end of an arm 16 the other end of which fits between a pair of ribs 17 formed on the inner side of a shoe 18 having at the end adjacent to the respective arm 11 an outwardly extending leg 19 provided on its outer end with a toe 20 forming a rim engaging hook. Each of these legs and hooks carries a bearing roller 21 to enable it to move readily and securely engage the rim R on which the spare tire, not shown, is carried. The outer end of the shoe is provided with an outwardly turned hook 22 engaging the outer portion of said rim.

The outer end of each arm is provided with a cross pin 23 which moves in diagonal slots 24 formed in the ribs 17 and having each an upwardly extending notch 25 at its front end and a downwardly extending notch 26 at the inner end adjacent to the spider. Pivoted to the extremity of the screw 12 is an operating lever 27 provided with an angularly disposed end 28 and this end and at least one of the arms 16 are provided with openings 29 which register in one position of the lever 27 so that the bow of a padlock may be fixed there through. Spanning each arm of the spider and held in a notch 30 is a detachable link 31 which engages the leg 19 and holds the shoe adjustably to the spider in a vertical position.

In operating we may assume that the parts are positioned to receive a rim or rim and tire. In this case these parts will be in the position shown in Figures 3 and 4. When in this position the rim R is slipped on to the shoes 18 as shown in Figure 4. The lever 27 is then operated to unscrew the screw 12 and thus force the sleeve 14 outwardly. Since this causes the arms 16 to move toward a position parallel to the spider arms 11 it leaves the outer ends of these shoes as shown in Figure 5. Since each shoe is angled between its outer and inner portions the lifting of the outer end will tilt the rear end downwardly and the hook 20 engages the outer part of the rim R while the hook 22 rises up on the other side of said rim. By reason of the notch 25 the arms 16 can not be swung toward the spider and the lever 27 may be swung up to bring the openings 29 in registry and the device locked in this position. However, reversing this motion will free the rim for removal.

To contract the rim the latter is placed on the shoes with these shoes in the position shown in Figure 3 and the pins are moved in the slots to engage the notches 26 shown in dotted lines in Figure 4. Then by unscrewing the screw the inner part of each shoe is drawn toward the center and the hook 20 catches and contracts the rim.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope of the claims.

Having thus described the invention, what is claimed as new, is:

1. In a device of the kind described, a spider having a hub and arms radiating therefrom, an adjusting screw threaded into the hub, tilting shoes engageable with a tire rim supported on the spider arms, a collar journaled on the screw and held to move longitudinally therewith, and link arms connecting said collar and tilting shoes to tilt the shoes as the screw is moved, said link arms each having a cross pin at its outer end and the shoes each having a rib provided with a diagonally disposed slot having lateral notches at its ends, the pin being movable in the slot for selective seating in said notches.

2. In a device of the kind described, a spider having a hub and arms radiating therefrom, an adjusting screw threaded into the hub, tilting shoes engageable with a tire rim supported on the spider arms, a collar journaled on the screw and held to move longitudinally therewith, link arms connecting said collar and tilting shoes to tilt the shoes as the screw is moved, said link arms each leaving a cross pin at its outer end and the shoes each having a rib provided with a diagonally disposed slot having lateral notches at its ends, the pin being movable in the slot for selective seating in said notches, and an operating lever having one end pivoted to the screw and its other end adapted to lie beside a link arm in one position of the lever, said last end and arm having registerable openings for reception of a shackle.

In testimony whereof I affix my signature.

HARRY L. SWAN.